(No Model.)
H. M. SMALL.
HOBBY HORSE OR ROCKERMOTIVE.
No. 253,557. Patented Feb. 14, 1882.
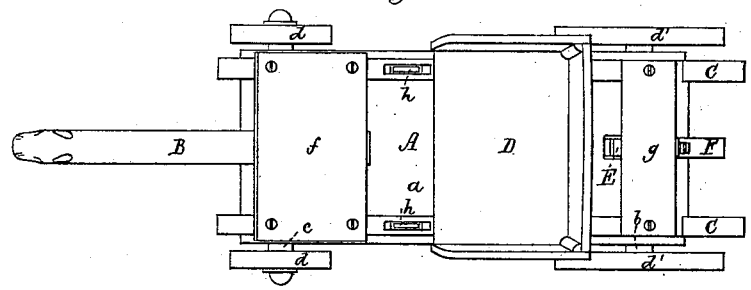
Witnesses.
S. N. Piper
E. B. Pratt
Inventor,
Herbert M. Small.
by R. H. Eddy atty.

UNITED STATES PATENT OFFICE.

HERBERT M. SMALL, OF BALDWINSVILLE, ASSIGNOR TO HIMSELF AND SUMNER SMALL, OF NORTHBOROUGH, MASSACHUSETTS.

HOBBY-HORSE OR ROCKER MOTIVE.

SPECIFICATION forming part of Letters Patent No. 253,557, dated February 14, 1882.

Application filed December 2, 1881. (No model.)

*To all whom it may concern:*

Be it known that I, HERBERT M. SMALL, of Baldwinsville, of the county of Worcester and State of Massachusetts, have invented a new and useful Improvement in Hobby-Horses or Rocker Motives; and I do hereby declare the same to be described in the following specification and represented in the accompanying drawings, of which—

Figure 1 is a top view, Fig. 2 a side elevation, and Fig. 3 a longitudinal section, of a vehicle embracing my invention, the nature of which is defined in the claim hereinafter presented.

In carrying out my invention I have combined a four-wheeled truck with rockers and a seat thereto and mechanism which, by the motions of the rockers on the platform of the truck, will cause the rear wheels of the truck to be revolved so as to impel or move the truck along.

In the said drawings, A denotes the four-wheeled truck, whose platform is shown at $a$, its rear axle at $b$, its front axle at $c$, and its wheels at $d\ d\ d'\ d'$. A pintle, E, fixed to and extending up from the forward axle, has projecting from its upper part a tongue, B, shaped like the neck and head of a horse. It is intended for reins to be led from the said head through suitable eyes or guides on the truck, and thence to the hands of the child or person who may be sitting upon the seat. By means of such reins the rider can turn aside the tongue more or less, in order from time to time to vary the direction of movement of the truck as occasion may require.

Upon the platform of the truck is a set of rockers, C C, united by cross-boards $f\ g$, each rocker being mortised vertically to receive one or more tenons, $h$, extended upward from the platform, such tenons and mortises serving to keep the rockers in place upon the platform. Legs or standards $i\ i$ project upward from the rockers and support a seat, D.

Upon the rear axle, at its middle, there is fixed concentrically with such axle a ratchet-wheel, E. An elastic or other proper pawl, F, to operate with such wheels is fixed to the rear cross-board, $g$, of the rockers, all being arranged as represented.

A child, while sitting upon the seat and having his feet on the front cross-board, $f$, can put the rockers in motion or rock them upon the platform, and as a consequence cause the pawl to actuate the ratchet-wheel in a manner to revolve the rear axle and the wheels thereof, which are to be fastened thereto, so as to be movable with and by it. By thus operating the said rear wheels the vehicle will be impelled or driven forward, and the child will derive exercise and pleasure in the meantime.

I claim as my invention—

The rocker motive substantially as described, consisting of the four-wheeled truck, the rockers, their connecting-boards and seat, and the ratchet-wheel and pawl, all arranged substantially in manner and to operate as set forth.

HERBERT M. SMALL.

Witnesses:
S. E. SMALL,
ANNIE SANDERS.